US005665944A

United States Patent [19]

Aulanko et al.

[11] Patent Number: 5,665,944

[45] Date of Patent: Sep. 9, 1997

[54] ELEVATOR MACHINERY

[75] Inventors: Esko Aulanko, Kerava; Harri Hakala, Hyvinkää, both of Finland

[73] Assignee: Kone Oy, Helsinki, Finland

[21] Appl. No.: 266,696

[22] Filed: Jun. 28, 1994

[30] Foreign Application Priority Data

| | | | |
|---|---|---|---|
| Jun. 28, 1993 | [FI] | Finland | 932976 |
| Dec. 28, 1993 | [FI] | Finland | 935908 |

[51] Int. Cl.⁶ ........ B66B 1/00; H02K 7/00; H02K 11/00

[52] U.S. Cl. ........ 187/277; 187/250; 187/254; 310/67 R; 310/254; 310/268

[58] Field of Search ........ 187/250, 254, 187/251, 277; 310/67 R, 268, 266, 112, 254, 179, 191, 209

[56] References Cited

U.S. PATENT DOCUMENTS

| | | | |
|---|---|---|---|
| 3,101,130 | 8/1963 | Bianca | 187/20 |
| 4,361,776 | 11/1982 | Hayashi et al. | 310/268 |
| 4,771,197 | 9/1988 | Ivanto et al. | 310/67 R |
| 4,960,186 | 10/1990 | Honda | 187/20 |
| 4,987,333 | 1/1991 | Noguchi et al. | 310/268 |
| 5,018,603 | 5/1991 | Ito | 187/17 |
| 5,024,162 | 6/1991 | Nigg et al. | 104/178 |
| 5,062,501 | 11/1991 | Pavoz et al. | 187/112 |
| 5,142,181 | 8/1992 | Newell | 310/268 |
| 5,144,183 | 9/1992 | Farrenkopf | 310/68 |
| 5,289,069 | 2/1994 | Hasegawa et al. | 310/156 |
| 5,334,899 | 8/1994 | Skybyk | 310/268 |
| 5,455,474 | 10/1995 | Flynn | 310/181 |
| 5,495,131 | 2/1996 | Goldie et al. | 310/12 |

*Primary Examiner*—Robert Nappi

[57] ABSTRACT

The elevator machinery (26) comprises a motor (6) and its traction sheave (18). The rotor (17) is disc-shaped and air gap (ag) between it and the stator (14) can turn a plane which is substantially perpendicular to the shaft (13). The stator (14) forms a ringlike sector (28) and is placed in an outer part and the traction sheave (18) is fixed to the rotor, between the stator (14) and the shaft (13). The diameter of the traction sheave is smaller than that of the rotor. The structure of the motor allows the use of traction sheaves (18) of different diameters (2*Rv) with rotors (17) of the same diameter. The motor is very flat. In i.e. other words its length the axial direction is small.

25 Claims, 5 Drawing Sheets

ELEVATOR MACHINERY

FIELD OF THE INVENTION

The present invention relates to an elevator machinery comprising a motor, a traction sheave designed to move the elevator ropes, a bearing, a shaft, a stator provided with a winding, and a rotating disc-shaped rotor.

DESCRIPTION OF THE BACKGROUND ART

Traditionally, an elevator machinery consists of a hoisting motor which, via a gear, drives the traction sheaves around which the hoisting ropes of the elevator are passed. The hoisting motor, elevator gear and the traction sheaves are generally placed in a machine room above the elevator shaft. They can also be placed beside or under the elevator shaft.

Another known solution is to place the elevator machinery in the counterweight of the elevator. A system with a traditional elevator machinery placed in the counterweight is presented for example, in U.S. Pat. No. 3,101,130. A drawback with the placement of the elevator motor in this solution is that it requires a large cross-sectional area of the elvator shaft.

A third previously known technique is to use a linear motor as the hoisting motor of the elevator and to place it in the counterweight.

Using a linear motor as the hoisting motor of an elevator involves problems beacause either the primary part or the secondary part of the motor has to be as long as the shaft. Therefore, linear motors are expensive to use as elevator motors. A linear motor for an elevator, placed in the counterweight, is presented for example, in U.S. Pat. No. 5,062,501. However, a linear motor placed in the counterweight has certain advantages, such as the fact that no machine room is needed and that the motor requires but a relatively small cross-sectional area of the counterweight.

The motor of an elevator may also be of the external-rotor type, with the traction sheave connected directly to the rotor. Such a structure is presented for example, in U.S. Pat. No. 4,771,197. The motor is gearless. The problem with this structure is that, to achieve a sufficient torque, the length and diameter of the motor have to be increased. In the structure presented in U.S. Pat. No. 4,771,197, the length of the motor is further increased by the brake, which is placed alongside of the rope grooves. Moreover, the blocks supporting the motor shaft increase the motor length still further.

In U.S. Pat. No. 5,018,603, FIG. 8 presents an elevator motor in which the air gap is oriented in a direction perpendicular to the motor shaft. Such a motor is called a disc motor or a disc rotor motor. These motors are gearless, which means that the motor is required to have a slow running speed and a higher torque than a geared motor. In the motors of U.S. Pat. Nos. 5,018,603 and 4,771,197, the outermost part of the motor is the traction sheave, leaving the effective magnetic area of the motor windings inside the traction sheave. This is a disadvantage when the motor is required to have a high torque.

SUMMARY OF THE INVENTION

The object of the present invention is to produce a new structural solution for an elevator machinery, designed to eliminate the above-mentioned drawbacks of elevator-motors constructed according to previously known technology. A further object is to achieve a flat elevator motor which can be placed in the counterweight or elevator shaft and which can be used to vary the speed of the elevator.

The invention is characterized by elevator machinery comprising a motor provided with a frame plate, at least one bearing, a shaft, at least one stator with a winding and a rotating disc-shaped rotor with an air gap between them. The elevator machinery also has a tracking sheave provided with rope grooves and designed to move the elevator ropes.

The advantages of the invention include the following:

Using the motor structure of the invention, a higher torque can be produced than by an external-rotor type motor of the same volume because the motor of the invention can have an air gap of a larger cross-sectional area.

As the diameter of the traction sheave is smaller than that of the rotor, the moment at the periphery of the traction sheave is by an amount corresponding to the ratio of the diameters than if the traction sheave were placed e.g. on the periphery of the rotor.

In addition, a traction sheave with a different diameter can alternatively be attached to the same rotor, causing a corresponding change in the tractive force transmitted by the machine to the ropes. This feature can be used to set a desired elevator speed within certain limits.

The motor structure is advantageous with respect to cooling because the stator can be divided into sectors, admitting cooler air to the rotor for its cooling. In this solution, the external stator area is larger than in a conventional motor, so the rotor and stator are well cooled. When a motor according to the invention is placed in the counterweight, the cooling is further enhanced as the counterweight moves.

As compared to a linear motor, the motor of the invention, when used as an elevator motor, provides the advantage that it makes it unnecessary to build a rotor or stator extending over the whole length of the elevator shaft.

The problem regarding the space required by the motor which limits the use of a motor according to U.S. Pat. No. 4,771,197, is also solved by the present invention because the axial length of the motor of the invention is smaller. Therefore, the cross-sectional area of the motor/counterweight of the invention in the cross-section of the elevator shaft is also small and the motor/counterweight can thus be easily accommodated in the space normally reserved for a counterweight.

The axial length of the motor of the invention is very small. The small axial length also means that the elevator machinery of the invention can be placed in various locations in the elevator shaft, e.g. in the place of a diverting pulley or in the bottom or top part of the shaft, without increasing the shaft dimensions from what they would be in any case.

The motor of the invention can be placed in the counterweight symmetrically relative to the elevator guide rails, which is an advantage regarding the guide rail strenth required.

The motor may be a reluctance, synchronous, asynchronous or d.c. motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is described in detail in the light of an embodiment by referring to the drawings which are given by way of illustration only, and thus are not limitative of the present invention, and in which.

DETAILED DESCRIPTION OF THE PREFERRED EMBODIMENTS

Figure 1:
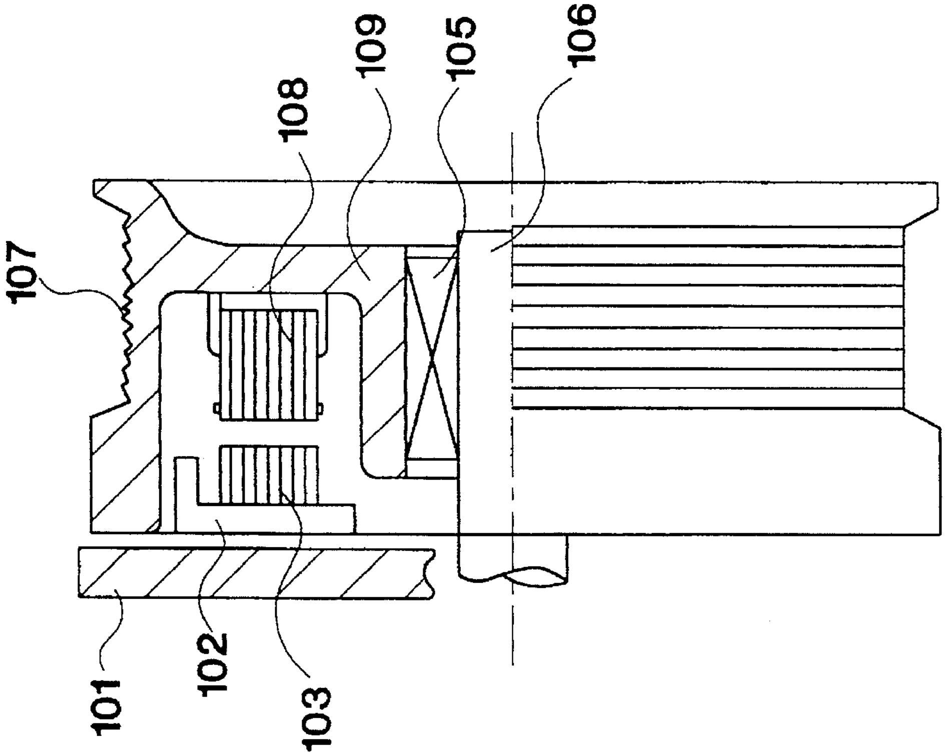
FIG. 1 PRIOR ART
FIG. 1 presents a cross-section of an elevator machinery according to previously known technology.

FIG. 1 shows a previously known elevator motor in which the motor shaft 106 and the stator 103 with the stator winding are mounted on a supporting bracket 101 by means of a supporting element 102. Rotating about the shaft 106 is a disc 109 with a grooved traction sheave 107 attached to its outermost part. The disc and the traction sheave form a cup-like structure in which the traction sheave is the outermost part of the motor. The rotor 108 and its winding are also attached to the disc. FIG. 1 corresponds to FIG. 8 of U.S. Pat. No. 5,018,603.

Figure 2:
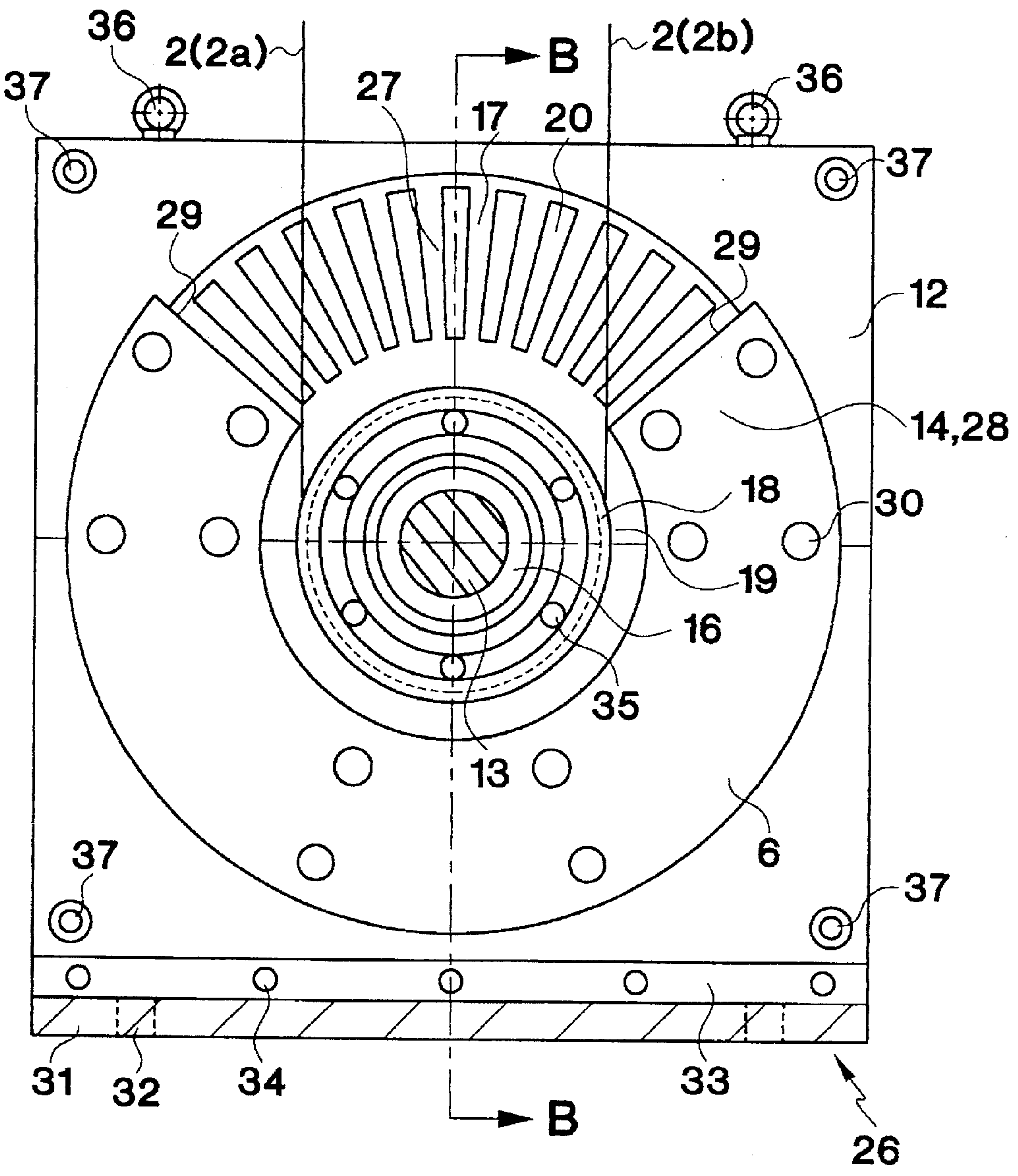
FIG. 2 presents an elevator machinery according to the present invention as seen from the direction of the motor shaft.

FIG. 2 presents an elevator machinery 26 according to the present invention as seen from the direction of the motor shaft 13 (FIG. 4, section A—A), with the front frame plate ("shield") 11 removed. The motor 6 is built between the frame plates 11 and 12. The motor shaft 13 is mounted at the midpoint of the frame plate diameters, thus producing a symmetrical structure. The shaft 13 is fixed with respect to the frame plates 11 and 12, and a bearing 16 is provided between the shaft 13 and the rotor 17. Alternatively, the bearing 16 may be placed between the frame plates and the shaft. Attached to the rotor by means of fixing elements 35 are two traction sheaves 18 provided with rope grooves 19. In cross-section, the stator has the form of a ringlike sector 28, but the size and shape of the sector may vary; it may be composed e.g. of rhombic parts. The elevator ropes 2 pass through the opening 27 of the stator sector 28 past the end sides 29 of the sector. The ropes running in different directions are indicated with **2*a* and 2*b*. The stator 14 is fixed to the frame plates 11 and 12 by means of stator fixing elements 30. The frame plates are joined together by their corners by means of frame plate joining elements 37. The motor is mounted on a base 31 by fixing the frame plates 11 and 12 to rails 33 on the base 31 by means of motor fixing elements 34. The devices presented above form an elevator machinery 26, which is mounted in its place of operation by means of base fixing elements 32, e.g. screws. For haulage and mounting of the elevator machinery, the machinery is provided with lifting elements 36. It is also possible to fix the elevator machinery 26 to its place of operation directly by the frame plates 11 and 12**.

Figure 3:
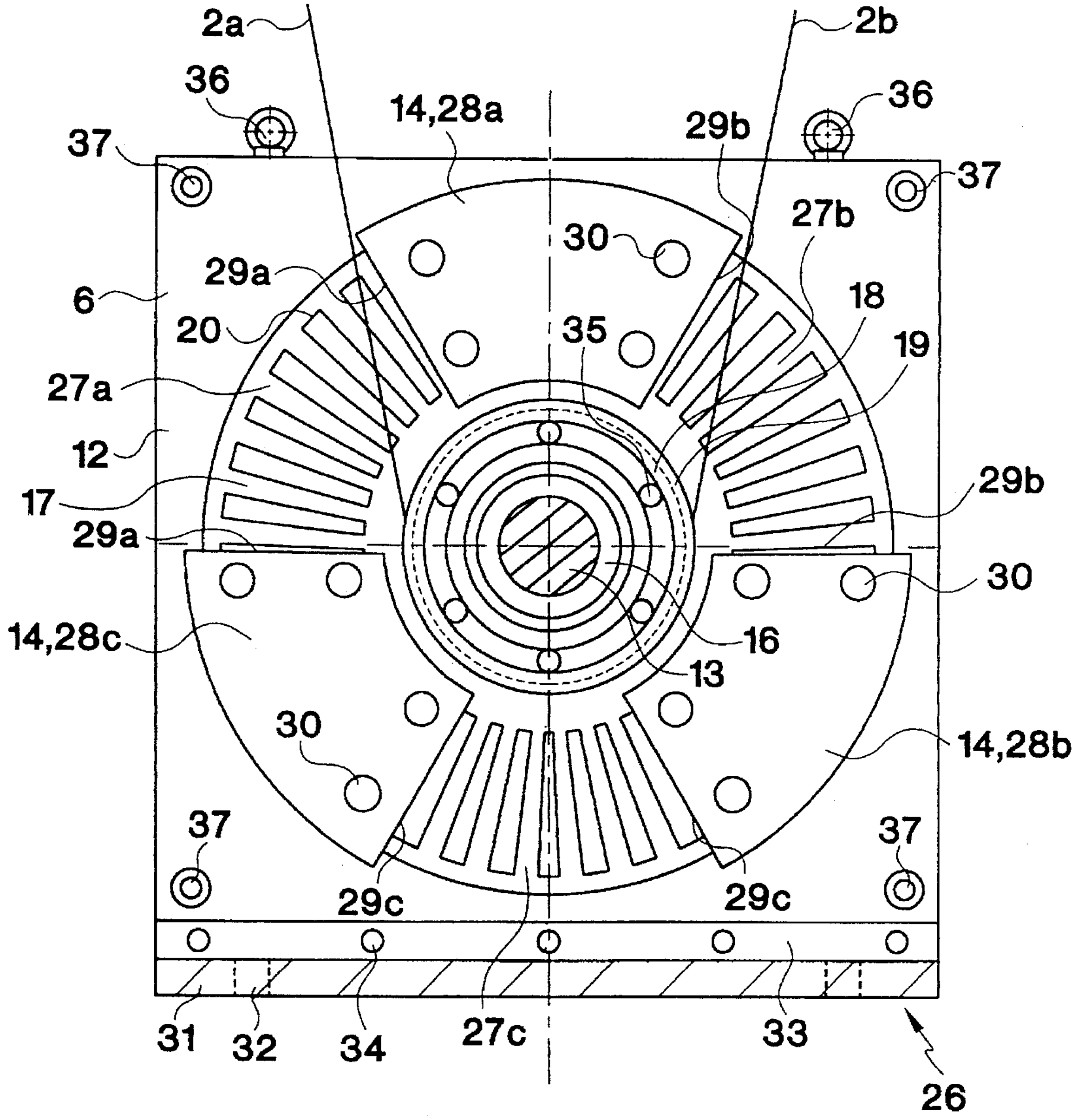
FIG. 3 presents an elevator machinery according to another embodiment of the present invention as seen from the direction of the motor shaft.

FIG. 3 presents an elevator machinery which is like the one in FIG. 2 except that in this embodiment the stator sector 28 is divided into three separate smaller sectors **28*a*, 28*b* and 28*c***. This embodiment provides the advantage that the rotor is cooled more effectively. The cooling of the stator is improved as well because the stator sectors have a larger cooling surface area. Another advantage is that the stator sectors can be manufactured by making use of the advantage provided by the identical design of the sectors.

In the embodiment of the invention presented in FIG. 3, all the elevator ropes 2 driven by the traction sheave 18 may run either through the opening **27*a* between two stator subsectors, e.g. 28*a* and 28*c*, between end sides 29*a*, or they may be so arranged that the elevator ropes 2*a* going in one direction pass through the opening 27*a* between subsectors 28*a* and 28*c* of the stator 14 between end sides 29*a* while the elevator ropes 2*b* going in the other direction pass between subsectors 28*a* and 28*b* of the stator 14, between end sides 29*b***. FIG. 3 presents the latter alternative. The size and shape of the stator subsectors may vary, they can be e.g. of a rhombic or rectangular form as seen from the direction of the motor shaft.

Figure 4:
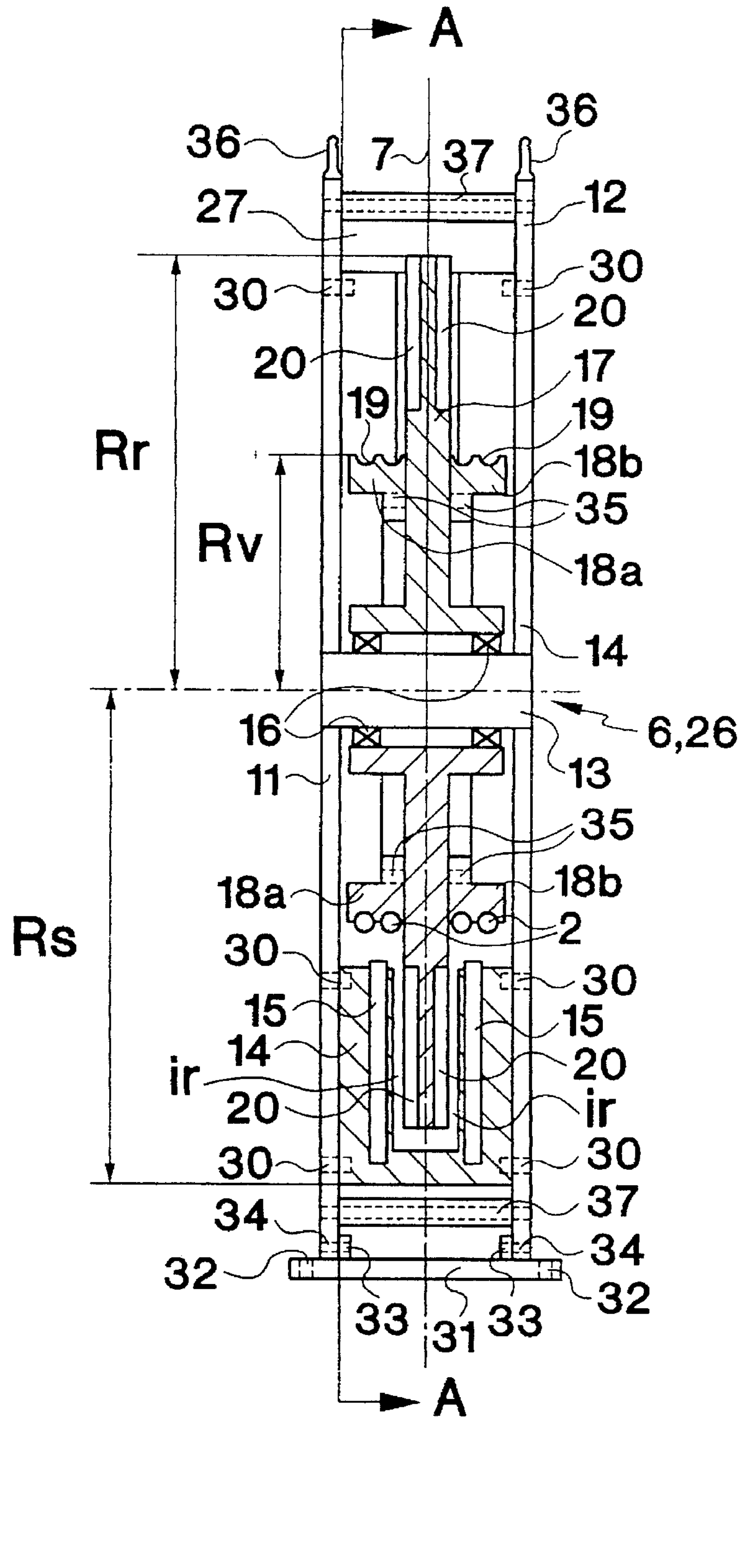
FIG. 4 presents a cross-section of the elevator machinery of the invention.

FIG. 4 presents section B—B of the elevator machinery shown in FIG. 2. The motor is fixed to the frame plates 11 and 12 by the stator sectors 28 and the motor shaft 13. Thus, the frame plates 11 and 12 constitute the end shields of the motor and act as parts transmitting the reactions of support of the motor. For the sake of clarity, the frame plates 11 and 12 and base 31 are not depicted with oblique strokes in the sectional view B—B. The elevator ropes 2 are only represented by their cross-sections at the lower edge of the traction sheave.

The rotor 17 is mounted on the motor shaft 13 by means of a bearing 16. The rotor is a disc-shaped body placed substantially at the middle of the shaft 13 in the axial direction. The traction sheave 18 consists of two ringlike halves **18*a* and 18*b* having the same diameter and provided with rope grooves 19. The halves 18*a*, 18*b* are placed on the rotor on opposite sides in the axial direction, between the windings 20 and the motor shaft. The same number of elevator ropes can be placed on each half of the traction sheave. The structure of the elevator machinery is symmetrical both with respect to the center line 7** and to the plane of section B—B in FIG. 2.

The diameter 2*Rv of the traction sheave is smaller than the diameter 2*Rs of the stator or the diameter 2*Rr of the rotor. The diameter 2*Rv of the traction sheave attached to the rotor 17 can be varied for the same rotor diameter 2*Rr, producing the same effect as by using gears with different transmission ratios between the elevator motor and the traction sheave. The two halves **18*a* and 18*b* of the traction sheave are attached to the rotor disc 17 by means of fixing elements 35 known in themselves, e.g. screws. Naturally, the two halves 18*a* and 18*b*** of the traction sheave can be integrated with the rotor to form a single body. The rotor and traction sheave of the motor of the invention can also be implemented by first building a traction sheave and then adding a rotor disc around it.

The stator 14 with its winding 15 can be composed of one or more stator subsectors **28*a*, 28*b*, 28*c***, as illustrated by FIG. 3. Each subsector of the stator may form a structure having the shape of a hand clasped around the edge of the rotor.

The size and shape of the subsectors **28*a*, 28*b*, 28*c* may vary. The angle of a subsector may be e.g. 60°. The total angle of the stator subsectors may typically vary between 240° . . . 300°. The stator subsectors 28*a*, 28*b*, 28*c* can also be placed unsymmetrically, leaving between the subsectors one or more openings that are larger than the others, although FIG. 3 presents a symmetrical solution. The rotor 17 and the stator 14 are separated by two air gaps ag so oriented that the planes formed by them are substantially perpendicular to the motor shaft 13. In the motor structure illustrated by FIG. 4**, an air gap oriented obliquely to the shaft can be applied.

As compared with motors constructed according to previously known technology, the elevator machinery (and motor) of the invention is very flat. It can therefore be installed in many places in an elevator system where previously known motors are difficult, even impossible to install without an increased space requirement. If necessary, the elevator machinery 26 can also be provided with a brake, which is placed e.g. inside the traction sheave, between the rotor 17 and the frame plates 11 and 12. The rotor can easily be equipped with accessories, such as a pulse tachometer for the measurement of velocity and distance.

Figure 5:
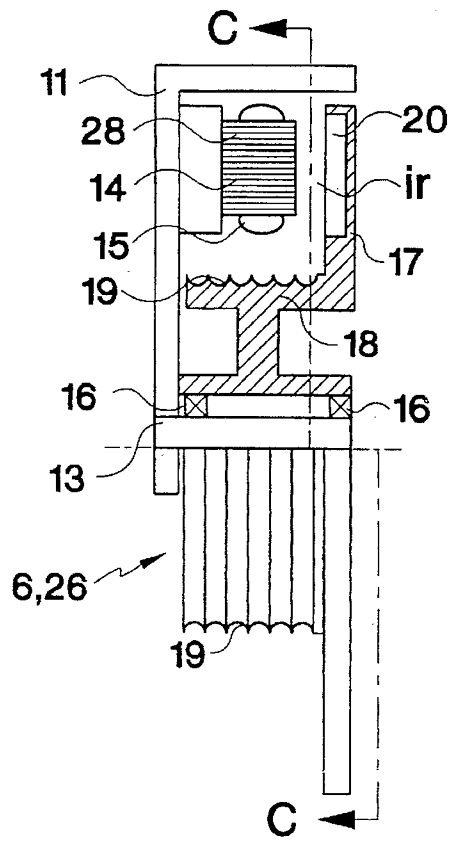
FIG. 5 presents a cross-section of an elevator machinery according to a third embodiment of the invention.

FIG. 5 illustrates a third embodiment of the invention. To render the figure more readable, its scale in the lengthwise direction of the shaft has been increased. FIG. 5 is a section along line D—D in FIG. 6. This embodiment has only one frame plate 11, to which the shaft 13 is fixedly attached. One end of the frame plate 11 is bent to an angle, allowing the elevator machinery to be mounted in a hanging position by fixing the bent portion to a support above it. It is also possible to turn the elevator machinery through 180°, in which case the elevator ropes go upwards from the traction sheave and the machinery is mounted in an upright position by fixing it to a base by the bent portion of the frame plate 11. Alternatively, the machinery can be fixed by the vertical portion of the frame plate 11, but in this case the advantage provided by the flatness of the machinery would be partly lost. Between the rotor 17 and stator 14 there is only one air gap ag, which forms a plane substantially perpendicular to the motor shaft. The traction sheave 18 consists of only one part instead of two parts placed on opposite sides of the rotor as in FIGS. 2 . . . 4. By using the motor design illustrated by FIGS. 5–6, an elevator machinery of a construction as flat as possible can be implemented.

Figure 6:
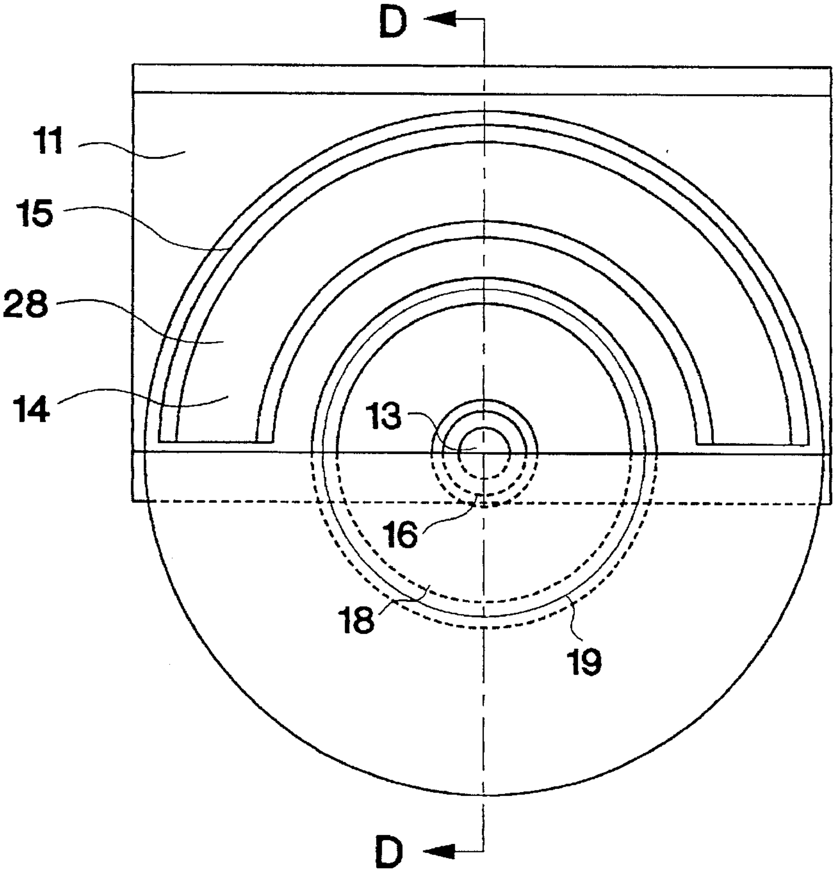
FIG. 6 presents an elevator machinery according to FIG. 5 as seen from the direction of the motor shaft.

FIG. 6 presents a cross-section C—C of the elevator machinery in FIG. 5. The elevator ropes are not shown, but they would go downwards from the traction sheave 18 in the figure. The diameter of the traction sheave is smaller than that of the rotor, as was the case in the elevator machineries presented in FIGS. 2 . . . 4. The size of the stator sector 28 is about 180° and it can be divided into subsectors *28a*, *28b*, *28c* as in FIG. 3. The subsectors can be placed closely side by side or at a distance from each other.

Figure 7:
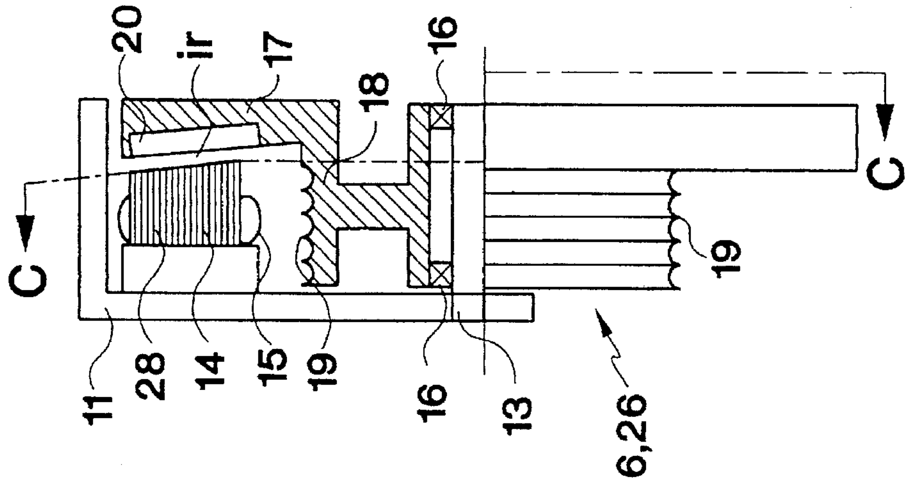
FIG. 7 presents an air gap placed in an oblique position.

FIG. 7 presents an embodiment of the invention which is otherwise identical with the one in FIG. 5 except that the the cross-section of the plane formed by the air gap, taken in the direction of the shaft, is in an oblique position with respect to the shaft. The air gap forms a surface having the form of a truncated cone. This allows the length of the air gap to be somewhat increased if necessary, as compared to the air gap length shown in FIG. 5.

It is obvious to a person skilled in the art that embodiments according to the invention are not restricted to the example described above, but that they can be varied within the scope of the claims presented below.

We claim:

1. Elevator machinery comprising:

a motor provided with a frame plate, at least one bearing, a shaft, at least one stator with a winding and a rotating disc-shaped rotor with an air gap therebetween, the stator forming a non-continuous semicircular sector, the rotor and stator both having a diameter and the air gap being the only air gap provided in the motor; and at least one traction sheave for moving elevator ropes, the at least one traction sheave being provided with rope grooves for receiving the elevator ropes, the at least one traction sheave being joined with the rotor and having a diameter that is smaller than the diameter of the rotor and smaller than the diameter of the stator, the rotor being generally aligned with a center of the sheave.

2. The elevator machinery according to claim 1, wherein the rotor is placed substantially in a middle of the motor relative to an axial direction of the shaft and the motor has two stator windings, one on each side of the rotor, and the traction sheave being divided into two parts, one on each side of the rotor.

3. The elevator machinery according to claim 1, wherein the diameter of the rotor is smaller than the diameter of the stator.

4. The elevator machinery according to claim 1, wherein the non-continuous semicircular sector is divided into subsectors.

5. The elevator machinery according to claim 4, wherein the subsectors are spaced a given distance from one another.

6. The elevator machinery according to claim 4, wherein three, generally equidistantly spaced subsectors are provided as the sector.

7. The elevator machinery according to claim 4, wherein openings are formed between the sectors and wherein all elevator ropes driven by the traction sheave in a first direction pass through a first opening formed between the subsectors and wherein all elevator ropes driven by the traction sheave in a second direction pass through a second opening formed between the subsectors.

8. The elevator machinery according to claim 4, wherein openings are formed between the subsectors and wherein all elevator ropes driven by the traction sheave pass through only one of the openings formed between the subsectors.

9. The elevator machinery according to claim 1, wherein the non-continuous semicircular sector has a c-shape with an opening therein.

10. The elevator machinery according to claim 9, wherein elevator ropes driven by the traction sheave run between end sides of the sector, the end sides of the sector forming the opening of the sector.

11. The elevator machinery according to claim 1, wherein all elevator ropes driven by the traction sheave run between end sides of at least one opening provided in the sector.

12. The elevator machinery according to claim 1, wherein the air gap is substantially perpendicular to the shaft of the motor.

13. The elevator machinery according to claim 1, wherein the elevator motor is mounted between two frame plates and the motor shaft is generally at right angles to the frame plates.

14. Elevator machinery comprising:

a motor provided with a frame plate, at least one bearing, a shaft, at least one stator with a winding and a rotating disc-shaped rotor with an air gap therebetween, the stator forming a non-continuous semicircular sector, the stator being provided on one side of the motor and the rotor being provided on another side of the motor such that only one air gap is provided in the motor, the rotor and stator both having a diameter; and at least one traction sheave for moving elevator ropes, the at least one traction sheave being provided with rope grooves, the at least one traction sheave being joined with the rotor and having a diameter that is smaller than the diameter of the rotor and smaller than the diameter of the stator.

15. The elevator machinery according to claim 14, wherein rotor is offset from a center of the traction sheave, the rotor being mounted to only one side of the traction sheave, and wherein the traction sheave, the frame plate and rotor enclose the stator.

16. The elevator machinery according to claim 14, wherein the non-continuous semicircular sector is divided into subsectors which are spaced at a given distance from one another.

17. The elevator machinery according to claim 14, wherein three, generally equidistantly spaced subsectors are provided as the sector.

18. The elevator machinery according to claim 14, wherein all elevator ropes driven by the traction sheave run between end sides of at least one opening provided in the sector.

19. The elevator machinery according to claim 14, wherein the air gap is substantially perpendicular to the shaft of the motor.

20. Elevator machinery comprising:

a motor provided with a frame plate, at least one bearing, a shaft, at least one stator with a winding and a rotating disc-shaped rotor with an air gap therebetween, the air gap being formed by faces of the stator and rotor which are at least in part non-perpendicular to the shaft such that at least a portion of the air gap is inclined with respect to the shaft and such that only one air gap is provided in the motor, the stator forming a non-continuous semicircular sector; and at least one traction sheave for moving elevator ropes, the at least one traction sheave being provided with rope grooves, the at least one traction sheave being joined with the rotor and having a diameter that is smaller than the diameter of the rotor.

21. The elevator machinery according to claim 20, wherein the air gap is generally in the form of a truncated cone in axial cross section.

22. The elevator machinery according to claim 20, wherein rotor is offset from a center of the traction sheave, the rotor being mounted to only one side of the traction sheave, and wherein the traction sheave, the frame plate and rotor enclose the stator.

23. The elevator machinery according to claim 20, wherein the non-continuous semicircular sector is divided into subsectors which are spaced at a given distance from one another.

24. The elevator machinery according to claim 20, wherein three, generally equidistantly spaced subsectors are provided as the sector.

25. The elevator machinery according to claim 20, wherein all elevator ropes driven by the traction sheave run between end sides of at least one opening provided in the sector.

* * * * *